(12) United States Patent
Ferguson et al.

(10) Patent No.: US 10,688,471 B2
(45) Date of Patent: *Jun. 23, 2020

(54) EXTRUDED TITANIA-BASED MATERIAL COMPRISING MESOPORES AND MACROPORES

(71) Applicant: BP p.l.c., London (GB)

(72) Inventors: Ewen James Ferguson, East Yorkshire (GB); Alexander James Paterson, East Yorkshire (GB); Zhaorong Zhang, Naperville, IL (US)

(73) Assignee: BP p.l.c., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/744,779

(22) PCT Filed: Jul. 14, 2016

(86) PCT No.: PCT/EP2016/066797
§ 371 (c)(1),
(2) Date: Jan. 13, 2018

(87) PCT Pub. No.: WO2017/009427
PCT Pub. Date: Jan. 19, 2017

(65) Prior Publication Data
US 2018/0200692 A1 Jul. 19, 2018

Related U.S. Application Data

(60) Provisional application No. 62/192,327, filed on Jul. 14, 2015.

(51) Int. Cl.
*B01J 21/06* (2006.01)
*B01J 23/42* (2006.01)
(Continued)

(52) U.S. Cl.
CPC ............ *B01J 21/063* (2013.01); *B01J 23/46* (2013.01); *B01J 23/74* (2013.01); *B01J 23/8892* (2013.01);
(Continued)

(58) Field of Classification Search
CPC . B01J 21/063; B01J 23/42; B01J 23/44; B01J 23/46; B01J 23/74; B01J 23/84;
(Continued)

(56) References Cited

U.S. PATENT DOCUMENTS 4,992,406 A  2/1991  Mauldin et al.
5,182,242 A  1/1993  Marler
(Continued)

FOREIGN PATENT DOCUMENTS

FR  2 992 236       12/2013
WO  2007068731 A1   6/2007
WO  2007071701 A1   6/2007

OTHER PUBLICATIONS

International Search Report and Written Opinion dated Oct. 14, 2016 for International Application No. PCT/EP2016/066797 filed Jul. 14, 2016, 12 pages.
(Continued)

*Primary Examiner* — Cam N. Nguyen
(74) *Attorney, Agent, or Firm* — McDonnell Boehnen Hulbert & Berghoff LLP

(57) ABSTRACT

Porous, extruded titania-based materials further comprising mesopores and macropores and/or prepared using one or more porogens, Fischer-tropsch catalysts comprising them, uses of the foregoing, processes for making and using the same and products obtained from such processes.

20 Claims, 3 Drawing Sheets

(51) Int. Cl.
*B01J 23/44* (2006.01)
*B01J 23/46* (2006.01)
*B01J 23/74* (2006.01)
*B01J 23/84* (2006.01)
*B01J 23/889* (2006.01)
*B01J 23/89* (2006.01)
*B01J 35/00* (2006.01)
*B01J 35/02* (2006.01)
*B01J 35/10* (2006.01)
*B01J 37/00* (2006.01)
*B01J 37/02* (2006.01)
*B01J 37/08* (2006.01)
*C10G 2/00* (2006.01)

(52) U.S. Cl.
CPC ......... *B01J 35/0093* (2013.01); *B01J 35/026* (2013.01); *B01J 35/109* (2013.01); *B01J 35/1014* (2013.01); *B01J 35/1042* (2013.01); *B01J 35/1061* (2013.01); *B01J 35/1066* (2013.01); *B01J 35/1071* (2013.01); *B01J 37/0018* (2013.01); *B01J 37/0201* (2013.01); *B01J 37/082* (2013.01); *C10G 2/32* (2013.01); *C10G 2/332* (2013.01); *B01J 37/088* (2013.01); *B01J 2523/00* (2013.01); *B01J 2523/3706* (2013.01); *B01J 2523/3712* (2013.01); *B01J 2523/72* (2013.01); *B01J 2523/82* (2013.01); *B01J 2523/845* (2013.01)

(58) Field of Classification Search
CPC .... B01J 23/8892; B01J 23/89; B01J 35/0093; B01J 35/026; B01J 35/1014; B01J 35/1042; B01J 35/1061; B01J 35/1066; B01J 35/1071; B01J 35/109; B01J 37/0018; B01J 37/0201; B01J 37/082; C10G 2/32; C10G 2/332
See application file for complete search history.

(56) References Cited

U.S. PATENT DOCUMENTS

| | | | |
|---|---|---|---|
| 5,417,949 | A | 5/1995 | McWilliams et al. |
| 5,484,757 | A | 1/1996 | Szymanski et al. |
| 6,130,184 | A | 10/2000 | Geerlings et al. |
| 8,729,140 | B2 | 5/2014 | Bezemer et al. |
| 8,946,116 | B2 * | 2/2015 | Xu .................. B01J 21/063 502/177 |
| 2005/0029715 | A1 | 2/2005 | Tressler et al. |
| 2005/0234137 | A1 | 10/2005 | Espinoza et al. |
| 2006/0286026 | A1 | 12/2006 | Dahar |
| 2008/0306173 | A1 | 12/2008 | Dogterom et al. |
| 2009/0011134 | A1 | 1/2009 | Hoek et al. |
| 2009/0326279 | A1 | 12/2009 | Tonkovich et al. |
| 2012/0115967 | A1 | 5/2012 | Bezemer et al. |
| 2012/0165417 | A1 | 6/2012 | Bezemer et al. |
| 2015/0191401 | A1 | 7/2015 | Liu et al. |

OTHER PUBLICATIONS

International Search Report for PCT/EP2016/066800, 4 pages, dated Oct. 14, 2016.
International Search Report of PCT/EP2016/066807, 4 pages, dated Oct. 5, 2016.
International Search Report of PCT/EP2016/06805, 6 pages, dated Oct. 5, 2016.

* cited by examiner

EXTRUDED TITANIA-BASED MATERIAL COMPRISING MESOPORES AND MACROPORES

This application is a national stage application under 35 U.S.C. § 371 of International Application No. PCT/EP2016/066797, filed Jul. 14, 2016, which claims priority to U.S. Provisional Patent Application No. 62/192,327, filed Jul. 14, 2015, the disclosures of which are explicitly incorporated by reference herein.

The present invention relates to a porous, extruded titania-based material comprising mesopores and macropores, particularly a porous, extruded, titania-based material comprising mesopores and macropores suitable for use as a catalyst support, more particularly a Fischer-Tropsch catalyst support. The invention also relates to a process for the preparation of the extruded titania-based material comprising mesopores and macropores, and processes for the production of Fischer-Tropsch synthesis catalysts comprising an extruded titania-based material comprising mesopores and macropores and having reduced selectivity for methane and/or improved selectivity for $C_{5+}$ hydrocarbons in Fischer-Tropsch reactions.

The conversion of synthesis gas into hydrocarbons by the Fischer-Tropsch process has been known for many years. The growing importance of alternative energy sources has seen renewed interest in the Fischer-Tropsch process as one of the more attractive direct and environmentally acceptable routes to high quality transportation fuels.

Many metals, for example cobalt, nickel, iron, molybdenum, tungsten, thorium, ruthenium, rhenium and platinum are known to be catalytically active, either alone or in combination, in the conversion of synthesis gas into hydrocarbons and oxygenated derivatives thereof. Of the aforesaid metals, cobalt, nickel and iron have been studied most extensively. Generally, the metals are used in combination with a support material, of which the most common are alumina, silica and carbon.

In the preparation of metal-containing Fischer-Tropsch catalyst, a solid support is typically impregnated with a metal-containing compound, such as a cobalt-containing compound, which may for instance be an organometallic or inorganic compound (e.g. $Co(NO_3)_2 \cdot 6H_2O$), by contacting with a solution of the compound. The particular form of metal-containing compound is generally selected for its ability to form an appropriate oxide (for example $Co_3O_4$) following a subsequent calcination/oxidation step. Following generation of the supported metal oxide, a reduction step is necessary in order to form the pure metal as the active catalytic species. Thus, the reduction step is also commonly referred to as an activation step.

It is known to be beneficial to perform Fischer-Tropsch catalysis with an extrudate, particularly in the case of fixed catalyst bed reactor systems. It is, for instance, known that for a given shape of catalyst particles, a reduction in the size of the catalyst particles in a fixed bed gives rise to a corresponding increase in pressure drop through the bed. Thus, the relatively large extrudate particles cause less of a pressure drop through the catalyst bed in the reactor compared to the corresponding powered or granulated supported catalyst. It has also been found that extrudate particles generally have greater strength and experience less attrition, which is a particular value in fixed bed arrangements where bulk crush strength may be very high.

An impregnated extrudate may be formed by mixing a solution of a metal-compound with a support material particulate, mulling, and extruding to form an extrudate before drying and calcining. Alternatively, an extrudate of a support material is directly impregnated, for instance by incipient wetness, before drying and calcining.

Commonly used support materials for Fischer-Tropsch catalysts include alumina, silica and carbon; however, a particularly useful material is extruded titania (titanium dioxide). Extruded titania support materials typically have a mesoporous structure, i.e. the extruded material comprises pores having a pore size of 2 to 50 nm.

It is known that including macropores, i.e. pores having diameters of greater than 50 nm, in catalyst support materials can be beneficial, for example by allowing increased metal loading and/or molecular diffusion. However, the incorporation of macropores may result in a reduction in the surface area of the catalyst support material, which can be detrimental, because it reduces the number of active sites for catalysis. Porous, extruded titania-based materials comprising mesopores and macropores have not previously been produced or suggested for use as catalyst supports. There therefore remains a need for a porous, extruded titania-based material comprising mesopores and macropores.

It has now surprisingly been found that including a porogen during the extrusion of a titania-based material enables the formation of both macropores and mesopores following removal of the porogen by thermal or oxidative decomposition. Surprisingly, the macropores may be formed without a significant impact on surface area. Fischer-Tropsch catalysts produced from such materials also have surprisingly improved catalyst activity and/or selectivity.

Thus, in a first aspect the present invention provides a porous, extruded titania-based material comprising mesopores and macropores.

The present invention further provides a process for the production of a porous, extruded titania-based material comprising mesopores and macropores according to the invention, said process comprising:
a) mixing titanium dioxide and one or more porogens to form a homogenous mixture;
b) adding a liquid extrusion medium to the homogenous mixture and mixing to form a homogenous paste;
c) extruding the paste to form an extrudate;
d) optionally drying the extrudate; and
e) calcining the extrudate at a temperature sufficient to decompose the one or more porogens.

The present invention further provides a Fischer-Tropsch synthesis catalyst comprising a porous, extruded titania-based material comprising mesopores and macropores according to the invention, and further comprising at least one metal selected from cobalt, iron, nickel, ruthenium or rhodium.

The present invention yet further provides a process for the preparation of a Fischer-Tropsch synthesis catalyst according to the invention, said process comprising:
a) mixing titanium dioxide and one or more porogens to form a homogenous mixture;
b) adding a solution of at least one thermally decomposable cobalt, iron, nickel, ruthenium or rhodium compound to the mixture, and mixing to form a homogenous paste;
c) extruding the paste to form an extrudate;
d) optionally drying the extrudate;
e) calcining the extrudate at a temperature sufficient to decompose the one or more porogens and to convert the at least one thermally decomposable cobalt, iron, nickel, ruthenium or rhodium compound to an oxide thereof, or to the metal form, and, where an oxide is formed, optionally f) heating the calcined extrudate under reducing conditions to convert the at least one cobalt, iron, nickel, ruthenium or rhodium oxide to the metal form.

The present invention further provides a process for the preparation of a Fischer-Tropsch synthesis catalyst according to the invention, said process comprising:

a) impregnating a porous, extruded titania-based material comprising mesopores and macropores according to the invention with a solution of at least one thermally decomposable cobalt, iron, nickel, ruthenium or rhodium compound;

b) drying and/or calcining the impregnated porous, extruded titania-based material at a temperature sufficient to convert the at least one thermally decomposable cobalt, iron, nickel, ruthenium or rhodium compound to an, oxide thereof, or to the metal form; and, where an oxide is formed, optionally c) heating the dried and/or calcined porous, extruded titania-based material under reducing conditions to convert the at least one cobalt, iron, nickel, ruthenium or rhodium oxide to the metal form.

There is yet further provided the use of a porogen to prepare a porous, extruded titania-based material comprising mesopores and macropores, and also the use of a porogen to prepare a porous, extruded titania-based Fischer-Tropsch synthesis catalyst comprising mesopores and macropores.

In a further aspect, the present invention provides a process for converting a mixture of hydrogen and carbon monoxide gases to hydrocarbons, which process comprises contacting a mixture of hydrogen and carbon monoxide with a Fischer-Tropsch synthesis catalyst according to the invention or a Fischer-Tropsch synthesis catalyst obtainable by a process according to the invention.

In a further aspect, the present invention provides a composition, preferably a fuel composition, comprising hydrocarbons obtained by a process according to the invention.

In a further aspect, the present invention provides a process for producing a fuel composition, said process comprising blending hydrocarbons obtained by a process according to the invention with one or more fuel components to form the fuel composition.

The pore diameter of the porous, extruded titania-based material comprising mesopores and macropores according to the present invention may be measured by any suitable method known to those skilled in the art, for example scanning electron microscopy or mercury porosimetry based on mercury intrusion using the Washburn equation with a mercury contacting angle of 130° and a mercury surface tension of 485 dynes/cm. As used herein, the term "pore diameter" equates with "pore size" and consequently refers to the average cross-sectional dimension of the pore, understanding, as the skilled person does, that a determination of pore size typically models pores as having circular cross-sections.

Preferably, the porous, extruded titanic-based material comprising mesopores and macropores according to the present invention comprises a multi-modal distribution of pores, i.e. the material comprises a range of pore sizes/pore diameters with two or more modes, such as two, three, four or more modes. Particularly suitable materials comprise a bi-modal distribution of pore sizes/pore diameters, i.e. a range of pore sizes/pore diameters comprising two modes, the first mode representing mesopores and the second mode representing macropores.

The porous, extruded titania-based material comprising mesopores and macropores according to the present invention suitably comprises mesopores having a pore diameter of 2 to 50 nm, for example 5 to 50 nm, preferably 15 to 45 nm or 20 to 45 nm, more preferably 25 to 40 nm or 30 to 40 nm.

The porous, extruded titania-based material comprising mesopores and macropores according to the present invention suitably comprises macropores having a pore diameter of greater than 50 nm, preferably 60 to 1000 nm, more preferably 100 to 850 nm.

The pore volume of a porous, extruded titanic-based material comprising mesopores and macropores according to the present invention may be measured by any suitable method known to those skilled in the art, for example using mercury porosimetry.

Suitably, the porous, extruded titania-based material according to the present invention has a total pore volume of at least 0.30 ml/g, preferably at least 0.40 ml/g, more preferably at least 0.50 ml/g. The upper limit of the total pore volume is not critical, so long as the material remains sufficiently robust to function as a catalyst support; however, a suitable maximum pore volume may be 1.00 ml/g, preferably 0.90 ml/g. Particularly preferred ranges of total pore volume for a porous, extruded titania-based material comprising mesopores and macropores according to the present invention are 0.30 to 1.00 ml/g, such as 0.40 to 1.00 ml/g, 0.40 to 0.90 ml/g or 0.50 to 0.90 ml/g.

The surface area of a porous, extruded titania-based material comprising mesopores and macropores according to the present invention may be measured in any suitable way known to those skilled in the art, such as by nitrogen porosimetry using the BET model to the nitrogen adsorption isotherm collected at 77K on a Quadrasorb SI unit (Quantachrome).

Suitably, a porous, extruded titania-based material comprising mesopores and macropores according to the present invention has a surface area of at least 30 $m^2/g$, preferably at least 40 $m^2/g$. The upper limit of the surface area is not critical, so long as the material is suitable for the intended use, such as a catalyst support; however, a suitable maximum surface area may be 60 $m^2/g$ or 55 $m^2/g$. A particularly suitable range of surface area for a porous, extruded titania-based material comprising mesopores and macropores of the present invention is 30 to 60 $m^2/g$, preferably 40 to 55 $m^2/g$.

The BET surface area, pore volume, pore size distribution and average pore radius of a porous, extruded titania-based material comprising mesopores and macropores may additionally be determined from the nitrogen adsorption isotherm determined at 77K using a Micromeritics TRISTAR 3000 static volumetric adsorption analyser. A procedure which may be used is an application of British Standard method BS4359: Part 1: 1984, "Recommendations for gas adsorption (BET) methods" and BS7591: Part 2: 1992, "Porosity and pore size distribution of materials"—Method of evaluation by gas adsorption. The resulting data may be reduced using the BET method (over the relative pressure range 0.05-0.20 $P/P_0$) and the Barrett, Joyner & Halenda (BJH) method (for pore diameters of 2 to 100 nm) to yield the surface area and pore size distribution respectively. Nitrogen porosimetry, such as described above, is the preferred method for determining the surface areas of the extruded titania-based materials according to the present invention.

Suitable references for the above data reduction methods are Brunaeur, 5, Emmett, P H, and Teller, E; J. Amer. Chem. Soc. 60, 309, (1938) and Barrett, E P, Joyner, L G and Halenda, P P; J Am. Chem. Soc., 1951, 73, 375 to 380.

As a further alternative, pore volume may be estimated through mercury porosimetry by use of an AutoPore IV (Micromeritics) instrument, and pore diameter may be measured from the mercury intrusion branch using the Washburn equation with a mercury contacting angle at 130° and a mercury surface tension of 485 dynes/cm. Further details are provided in ASTM D4284-12 Standard Test Method for Determining Pore Volume Distribution of Catalysts and Catalyst Carriers by Mercury Intrusion Porosimetry; and Washburn, E. W; The Dynamics of Capillary Flow (1921), Physical Review 1921, 17(3), 273. Mercury porosimetry, such as described above, is the preferred method for determining the pore volumes and pore diameters of the extruded titania-based materials according to the present invention.

The porous, extruded titania-based material comprising mesopores and macropores according to the present invention generally has a symmetrical geometry that includes, but is not limited to, cylinders, spheres, spheroids, pastilles, dilobes, such as cylindrical dilobes, trilobes, such as cylindrical trilobes, quadralobes, such as cylindrical quadralobes and hollow cylinders.

The porous, extruded titania-based material comprising mesopores and macropores according to the present invention may be prepared by any suitable extrusion process known to those skilled in the art, but modified so that one or more porogens are included in the titania-based material during extrusion and are subsequently removed by thermal or oxidative decomposition.

The porous, extruded titania-based material comprising mesopores and macropores according to the present invention may be prepared using any suitable form of titanium oxide, such as titanium dioxide (CAS No: 13463-67-7), titanium dioxide anatase (CAS No: 1317-70-0), titanium dioxide rutile (CAS No: 1317-80-2), titanium dioxide brookite (CAS No: 98084-96-9), and ad-mixtures or composites thereof.

Where the porous, extruded titania-based material comprising mesopores and macropores according to the present invention is to be used as a catalyst support it is preferably substantially free of extraneous metals or elements which might adversely affect the catalytic activity of the system. Thus, preferred porous, extruded titania-based materials comprising mesopores and macropores according to the present invention are preferably at least 95% w/w pure, more preferably at least 99% w/w pure. Impurities preferably amount to less than 1% w/w, more preferably less than 0.6% w/w and most preferably less than 0.3% w/w. The titanium oxide from which the porous, extruded titania-based material is formed is preferably of suitable purity to achieve the above preferred purity in the finished extruded product.

The porous, extruded titania-based material comprising mesopores and macropores according to the present invention may be prepared using any suitable porogen, i.e. a material capable of enabling the formation of macropores in an extruded titania-based material once it has been removed therefrom, for example by thermal or oxidative decomposition.

Suitable porogens for use in the process for the production of a porous, extruded titania-based material comprising mesopores and macropores according to the present invention comprise cellulose or derivatives thereof, such as methyl cellulose (CAS No: 9004-67-5), ethyl cellulose (CAS No: 9004-57-3) and ethyl methyl cellulose (CAS No: 9004-69-7); alginic acid (CAS No: 9005-32-7) or derivatives thereof, such as ammonium alginate (CAS No: 9005-34-9), sodium alginate (CAS No: 9005-38-3) and calcium alginate (CAS No: 9005-35-0); latex, such as polystyrene latex (CAS No: 26628-22-8) or polyvinylchloride (CAS No: 9002-86-2).

The proportion of total porogen to titanium dioxide used in the process of the present invention may be selected so as to provide a suitable proportion of macropores in the porous, extruded titania-based material. However, a preferred weight ratio of titanium dioxide to total porogen is from 1:0.1 to 1:1.0, preferably 1:0.1 to 1:0.8, more preferably 1:0.15 to 1:0.6.

In the process for the production of a porous, extruded titania-based material comprising mesopores and macropores according to the present invention, the titanium dioxide and one or more porogens may be mixed using any suitable technique to form a homogenous mixture, such as by mixing in a mechanical mixer. The liquid extrusion medium used to form a homogenous paste may be added to the homogenous mixture once mixing of the titanium dioxide and one or more porogens is complete, in which case mixing to form a homogenous paste may be carried out in the same apparatus used to form the homogenous mixture or in a different apparatus. Alternatively, the liquid extrusion medium may be added during the mixing of the titanium dioxide and one or more porogens, in which case mixing to form a homogenous paste will generally be earned out in the same equipment as used to form the homogenous mixture.

Any suitable liquid extrusion medium may be used in the process of the present invention, i.e. any liquid capable of causing the titanium dioxide and one or more porogens to form a homogenous paste suitable for extrusion. Water is an example of a suitable liquid extrusion medium.

The process for the production of a porous, extruded titania-based material comprising mesopores and macropores according to the present invention may optionally further comprise a mulling step to reduce the presence of larger particles that may not be readily extruded, or the presence of which would otherwise compromise the physical properties of the resulting extrudate. Any suitable mulling or kneading apparatus of which a skilled person is aware may be used for mulling in the context of the present invention. For example, a pestle and mortar may be suitably used in some applications or a Simpson muller may suitably be employed. Mulling is typically undertaken for a period of from 3 to 90 minutes, preferably for a period of 5 minutes to 30 minutes. Mulling may suitably be undertaken over a range of temperatures, including ambient temperatures. A preferred temperature range for mulling is from 15° C. to 50° C. Mulling may suitably be undertaken at ambient pressures.

The homogenous paste formed in the process for the production of a porous, extruded titania-based material comprising mesopores and macropores according to the present invention may be extruded to form an extrudate using any suitable extruding methods and apparatus of which the skilled person is aware. For example, the homogenous paste may be extruded in a mechanical extruder (such as a Vinci VTE 1) through a die with an array of suitable diameter orifices, such as 1/16 inch diameter, to obtain extrudates with cylindrical geometry.

The extrudate formed in a process for the production of a porous, extruded titania-based material comprising mesopores and macropores according to the present invention may be calcined at any temperature sufficient to at least partly decompose the one or more porogens, and preferably to fully decompose the one or more porogens.

Optionally, a drying step may be carried out before calcining.

Drying in accordance with the present invention is suitably conducted at temperatures of from 50° C. to 150° C., preferably 75° C. to 125° C. Suitable drying times are from 5 minutes to 24 hours. Drying may suitably be conducted in a drying oven or in a box furnace, for example, under the flow of an inert gas at elevated temperatures.

Calcination may be performed by any method known to those of skill in the art, for example in a fluidised bed or a rotary kiln, suitably at a temperature of at least 150° C., and preferably in the range of from 200° C. to 800° C., more preferably from 300° C. to 700° C., and yet more preferably from 500° C. to 600° C. Where the one or more porogens comprise cellulose, or a derivative thereof, and/or alginic acid, or a derivative thereof, calcining is preferably carried out at a temperature of at least 200° C., and preferably at least 500° C., more preferably 500 to 600° C.

The Fischer-Tropsch synthesis catalyst according to the present invention comprises a porous, extruded titania-based material comprising mesopores and macropores according to the present invention, or obtainable by a process according to the present invention, and further comprises at least one metal selected from cobalt, iron, nickel, ruthenium or rhodium, preferably cobalt. The amount of metal, on an elemental basis, present in the Fischer-Tropsch synthesis catalyst according to the present invention is suitably from 5 wt % to 30 wt %, preferably 7 wt % to 25 wt %, more preferably 10 wt % to 20 wt %, based on the total weight of the catalyst. As will be appreciated by the skilled person, the amount of metal, on an elemental basis, present in the Fischer-Tropsch synthesis catalyst may be readily determined by X-ray fluorescence (XRF) techniques.

The Fischer-Tropsch synthesis catalyst according to the present invention may additionally comprise one or more promoters, dispersion aids, binders or strengthening agents. Promoters are typically added to promote reduction of an oxide of metal to pure metal; for example cobalt to cobalt metal, preferably at lower temperatures. Preferably, the one or more promoters are selected from rhenium, ruthenium, platinum, palladium, molybdenum, tungsten, boron, zirconium, gallium, thorium, manganese, lanthanum, cerium or mixtures thereof. The promoter is typically used in a metal to promoter atomic ratio of up to 250:1, and more preferably up to 125:1, still more preferably up to 25:1, and most preferably 10:1.

The Fischer-Tropsch synthesis catalyst according to the present invention may be prepared by incorporating a solution of at least one thermally decomposable cobalt, iron, nickel, ruthenium or rhodium compound into a process for the production of a porous, extruded titania-based material comprising mesopores and macropores according to the present invention, i.e. by adding the solution of at least one thermally decomposable cobalt, iron, nickel, ruthenium or rhodium compound at any stage before extrusion of the homogenous paste.

Alternatively, the Fischer-Tropsch synthesis catalyst according to the present invention may be prepared by impregnating a porous, extruded titania-based material comprising mesopores and macropores according to the present invention with a solution of at least one thermally decomposable cobalt, iron, nickel, ruthenium or rhodium compound. Impregnation of the porous, extruded titania-based material comprising mesopores and macropores with the solution of at least one thermally decomposable cobalt, iron, nickel, ruthenium or rhodium compound in accordance with the present invention may be achieved by any suitable method of which the skilled person is aware, for instance by vacuum impregnation, incipient wetness or immersion in excess liquid. The impregnating solution may suitably be either an aqueous solution or a non-aqueous, organic solution of the thermally decomposable metal compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable metal-containing compound may be employed. Preferably, the solution of the thermally decomposable metal-containing compound is an aqueous solution.

Suitable metal-containing compounds are those which are thermally decomposable to an oxide of the metal following calcination, or which may be reduced directly to the metal form following drying and/or calcination, and which are completely soluble in the impregnating solution. Preferred metal-containing compounds are the nitrate, acetate or acetyl acetonate salts of cobalt, iron, nickel, ruthenium or rhodium, most preferably the nitrate, for example cobalt nitrate hexahydrate.

Following extrusion, the extrudate may be calcined at a temperature sufficient to decompose the one or more porogens and to convert the at least one thermally decomposable cobalt, iron, nickel, ruthenium or rhodium compound to an oxide thereof or to the metal form. Optionally, the extrudate may be dried before the calcining step.

Following impregnation, the impregnated extrudate may be dried and/or calcined at a temperature sufficient to convert the at least one thermally decomposable cobalt, iron, nickel, ruthenium or rhodium containing compound to an oxide thereof or to the metal form.

The drying and calcining temperatures and conditions suitable for producing a porous, extruded titania-based material comprising mesopores and macropores according to the present invention are also suitable for use in the processes for preparing Fischer-Tropsch synthesis catalysts according to the present invention.

Where an oxide of cobalt, iron, nickel, ruthenium or rhodium is formed during a process for the preparation of a Fischer-Tropsch synthesis catalyst according to the present invention, the material may be used as a catalyst in a Fischer-Tropsch reaction without further processing, and the oxide of cobalt, iron, nickel, ruthenium or rhodium will be converted to the metal form during such use. Alternatively, the material comprising an oxide of cobalt, iron, nickel, ruthenium or rhodium may optionally be heated under reducing conditions to convert the at least one cobalt, iron, nickel, ruthenium or rhodium oxide to the metal form before use as a Fischer-Tropsch synthesis catalyst. Any suitable means for converting the oxide of cobalt, iron, nickel, ruthenium or rhodium to the metal form known to those skilled in the art may be used.

Where promoters, dispersion aids, binders and/or strengthening aids are incorporated in the Fischer-Tropsch synthesis catalyst according to the present invention, the addition of these materials may be integrated at several stages of the process according to the present invention. Preferably, the promoter, dispersion aids, binder or strengthening aids are admixed during any stage prior to extrusion, or during the impregnation step.

The Fischer-Tropsch synthesis catalyst comprising a porous, extruded titania-based material comprising mesopores and macropores according to the present invention or a Fischer-Tropsch synthesis catalyst obtainable by a process according to the present invention may be used as a catalyst in any conventional Fischer-Tropsch process for converting a mixture of hydrogen and carbon monoxide gases to hydrocarbons. The Fischer-Tropsch synthesis of hydrocarbons from a mixture of hydrogen and carbon monoxide, such as syngas, may be represented by Equation 1:

$$m\text{CO} + (2m+1)\text{H}_2 \rightarrow m\text{H}_2\text{O} + \text{C}_m\text{H}_{2m+2} \qquad \text{Equation 1}$$

As discussed hereinbefore, the Fischer-Tropsch synthesis catalysts according to the present invention or obtainable by the process of the present invention have been surprisingly found to have improved catalyst activity and/or selectivity, particularly reduced selectivity for methane. The Fischer-Tropsch synthesis catalyst according to the present invention, or obtainable by process according to the present invention, therefore provides particularly useful ranges of hydrocarbons when used in a Fischer-Tropsch reaction.

A composition according to the present invention comprising hydrocarbons obtained by a process of the present invention is preferably a fuel composition, for example a gasoline, diesel or aviation fuel or precursor thereof.

The present invention will now be illustrated by way of the following Examples and with reference to the following Figures:

FIG. 1: graphical representation of pore size distribution of a titania extrudate prepared without using a porogen (Comparative Example 1), FIG. 2: graphical representation of pore size distribution of a titania extrudate prepared using cellulose as a porogen at a mass ratio of cellulose to titania of 1:0.5 (Example 1);

FIG. 3: scanning electron microscope images at various magnifications of a titania extrudate prepared using cellulose as a porogen at a mass ratio of titania to cellulose of 1:0.5 (Example 1),

EXAMPLES

Comparative Example 1

Titania Extrudate Comprising Mesopores

Titanium dioxide (BASF P25) was formulated with distilled water in a mechanical mixer (Vinci MX 0.4) and then extruded using a mechanical extruder (Vinci VTE 1) through a die with an array of 1/16 inch diameter orifices to obtain extrudates with cylindrical geometry, The extrudates were dried at a temperature of 100 to 120° C. overnight, followed by calcination in air flow at 500° C. for four hours, via a ramp of 2° C./min.

The resultant extrudate was characterised using nitrogen porosimetry (Quantachrome, Quadrasorb SI), mercury porosimetry (Micromeritics, AutoPore IV) and scanning electron microscopy.

FIG. 1 depicts the pore size distribution (PDS) of the extrudate prepared in Comparative Example 1 estimated from the mercury intrusion data using the Washburn equation with a contact angle of 130° and a surface tension of bulk mercury of 485 mN/m. This sample exhibits only mesopores, with mean pore diameters of 28 nm. The pore volume and surface area of this material is shown in Table 1. The total pore volume of this material is approximately 0.36 ml/g as determined from the mercury intrusion data. The surface area of this material analysed from the nitrogen adsorption isotherm using the Brunaeur-Emmett-Teller (BET) model is 51 $m^2/g$.

Example 1

Titania Extrudate Comprising Mesopores and Micropores Prepared Using a Cellulose Porogen A porous, titania-based extrudate was prepared by mixing a predetermined amount of titanium oxide (BASF P25) and a cellulose (Aldrich, Sigmacell Type 101) in a 360° rotating mixer (Turbula) and then formulating with distilled water in a mechanical mixer to obtain a paste with a mass ratios of titania to cellulose and water of 1.0:0.5:1.17. The resulting paste was extruded through a die with 1/16 inch diameter holes to obtain extrudates with cylindrical rod geometry.

The extrudate was dried at 110° C. overnight, followed by calcination at 500° C. for four hours, via a ramp of 2° C./min.

The resultant extrudate was characterised using nitrogen porosimetry, mercury porosimetry, and scanning electron microscopy, as described in Comparative Example 1.

Figure 1:
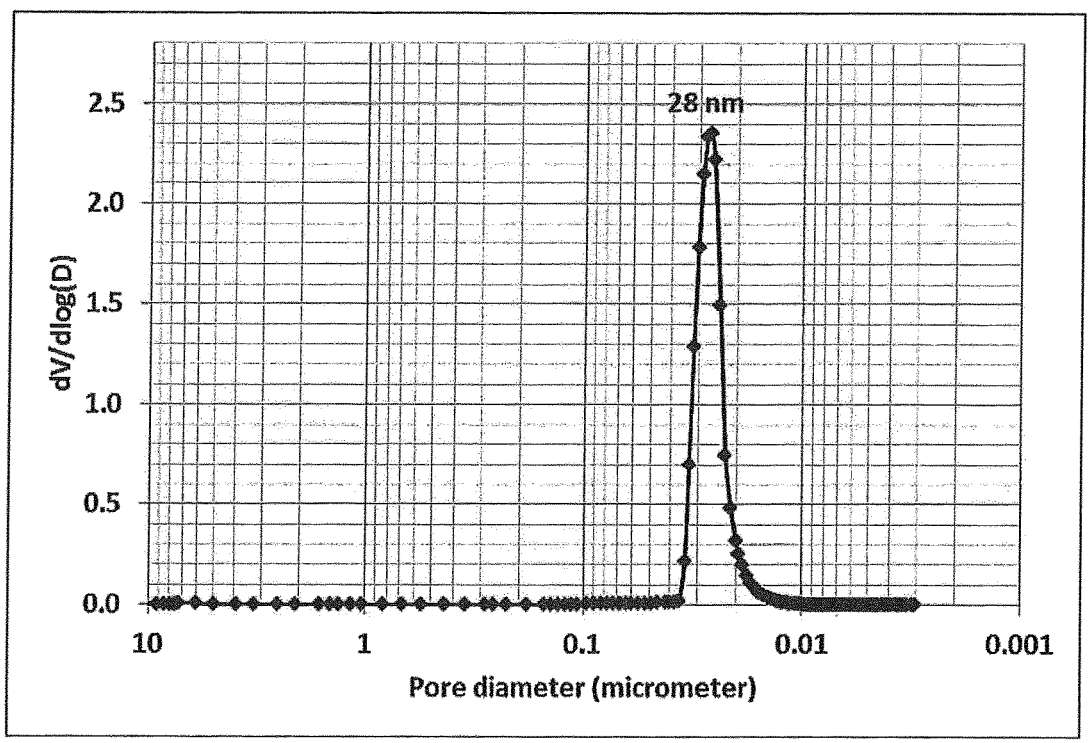
Figure 2:
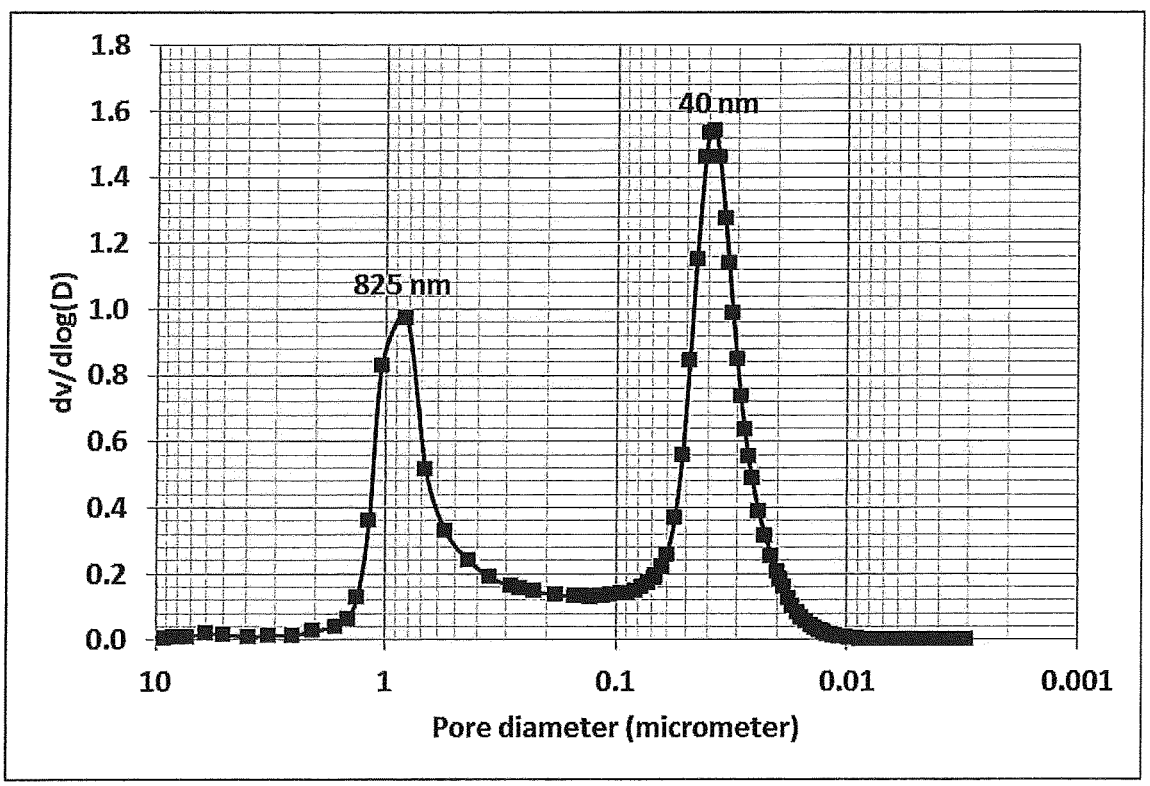
FIG. 2 depicts the pore size distribution of the material of Example 1, and shows a bimodal pore distribution centred at 40 nm (mesopores) and 825 nm (macropores).
Figure 3:
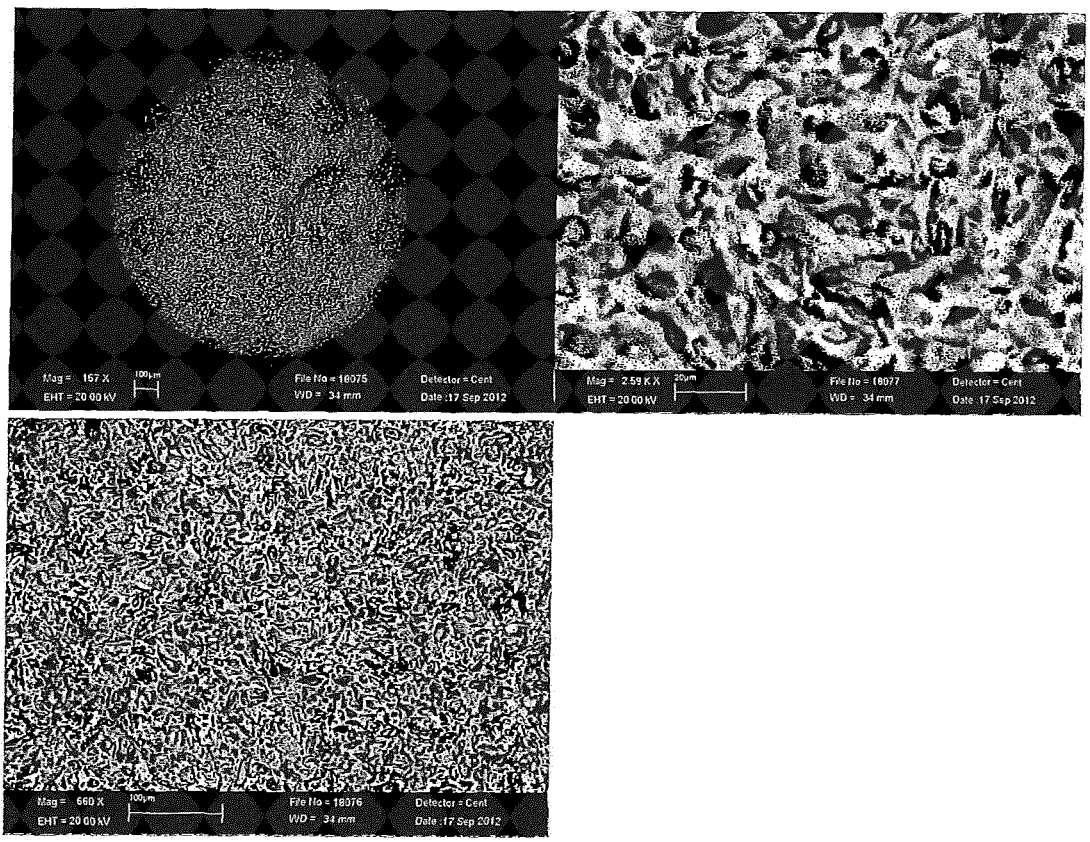
FIG. 3 shows scanning electron micrographs of samples of the extrudate formed in Example 1 at various magnifications, and clearly demonstrates the presence of uniform wormhole-like macropores in the extrudate.

Total pore volume and surface area values for the material of Example 1 are shown in Table 1. Owing to the formation of macropores, this material exhibits a mercury intrusion pore volume of 0.85 ml/g, which is substantially higher than the value (0.36 ml/g) of the material formulated without using porogen (Comparative Example 1). BET surface area of the material of Example 1 is 50 $m^2/g$, which is very similar to the extrudate formed without using the porogen in Comparative Example 1.

Example 2

Titania Extrudate Comprising Mesopores and Macropores Prepared Using a Cellulose Porogen A porous, titania-based extrudate was prepared according to the procedure set out in Example 1, with the exception that the mass ratio of titanium oxide to cellulose was adjusted to 1:0.4. The mixture of titanium oxide and cellulose was homogenised with a Turbula mixer, formulated with water in the trough of a Vinci mixer, extruded using a Vinci extruder, and dried and calcined as set out in Example 1.

The extrudate of Example 2 was characterised using nitrogen porosimetry, mercury porosimetry and scanning electron microscopy as described in Comparative Example 1, and the results are shown in Table 1.

The material of Example 2 exhibited a bi-modal pore size distribution with peaks at 32 nm and 674 nm, respectively. Total pore volume was 0.67 ml/g, and the BET surface area of the sample was 51 $m^2/g$.

Example 3

Titania Extrudate Comprising Mesopores and Macropores Prepared Using a Cellulose Porogen The procedure of Example 1 was repeated, with the exception that the mass ratio of titania to cellulose was adjusted to 1:0.3. The resulting mixture was homogenised, formulated with water, extruded, dried and calcined as set out in Example 1

The extrudate of Example 3 was characterised as set out in Comparative Example 1, and the results are shown in Table 1.

The calcined extrudate of Example 3 exhibited a bi-modal pore size distribution with peaks at 33 nm and 675 nm, respectively. The total pore volume was 0.6 ml/g, and the BET surface area was 51 $m^2/g$.

Example 4

Titania Extrudate Comprising Mesopores and Macropores Prepared Using a Cellulose Porogen The procedure of Example 1 was repeated, with the exception that the mass ratio of titania to cellulose was adjusted to 1:0.2. The resulting mixture was homogenised, formulated with water, extruded, dried and calcined as set out in Example 1.

The extrudate of Example 4 was characterised as set out in Comparative Example 1, and the results are shown in Table 1.

The calcined extrudate of Example 4 exhibited a bi-modal pore size distribution with peaks at 33 nm and 283 nm, respectively. The total pore volume was 0.53 ml/g, and the BET surface area was 52 $m^2/g$.

Example 5

Titania Extrudate Comprising Mesopores and Macropores Prepared Using a Cellulose Fibre as the Porogen The procedure of Example 1 was repeated, with the exception that an alternative form of cellulose (Aldrich Cellulose Fibre) was used as the porogen at a mass ratio of titania to cellulose of 1:0.5.

The mixture was homogenised, formulated with water, extruded, dried and calcined as set out in Example 1.

The calcined extrudate of Example 5 was characterised as set out in Comparative Example 1, and the results are shown in Table 1.

The calcined extrudate of Example 5 exhibited a bi-modal pore size distribution with peaks at 30 nm and 227 nm, respectively. The total pore volume was 0.63 ml/g, and the BET surface area was 48 $m^2/g$.

Example 6

Titania Extrudate Comprising Mesopores and Macropores Prepared Using a Cellulose as the Porogen The procedure of Example 1 was repeated, with the exception that an alternative form of cellulose (Aldrich Sigmacell Type 20) was used as the porogen at a mass ratio of titanium oxide to cellulose of 1:0.5.

The mixture was homogenised, formulated with water, extruded, dried and calcined as set out in Example 1.

The calcined extrudate of Example 6 was characterised as set out in Comparative Example 1, and the results are shown in Table 1.

The calcined extrudate of Example 6 exhibited a bi-modal pore size distribution with peaks at 34 nm and 183 nm, respectively. The total pore volume was 0.64 ml/g, and the BET surface area was 48 $m^2/g$;

Example 7

Titania Extrudate Comprising Mesopores and Macropores Prepared Using a Cellulose as the Porogen The procedure of Example 1 was repeated, with the exception that an alternative cellulose (Aldrich Sigmacell Type 50) was used as the porogen at a mass ratio of titanium oxide to cellulose of 1:0.5.

The mixture was homogenised, formulated with water, extruded, dried and calcined as set out in Example 1.

The calcined extrudate of Example 7 was characterised as set out in Comparative Example 1, and the results are shown in Table 1.

The calcined extrudate of Example 7 exhibited a bi-modal pore size distribution with peaks at 30 nm and 139 nm, respectively. The total pore volume was 0.61 ml/g, and the BET surface area was 49 $m^2/g$.

Example 8

Titania Extrudate Comprising Mesopores and Macropores Prepared Using Alginic Acid as the Porogen The procedure of Example 1 was repeated, with the exception that alginic acid (Aldrich) was used as the porogen at a mass ratio of titanium dioxide to alginic acid of 1:0.5.

The mixture was homogenised, formulated with water, extruded, dried and calcined as set out in Example 1.

The calcined extrudate of Example 8 was characterised as set out in Comparative Example 1, and the results are shown in Table 1.

The calcined extrudate of Example 8 exhibited a bi-modal pore size distribution with peaks at 36 nm and 504 nm, respectively. The total pore volume was 0.68 ml/g, and the BET surface area was 50 $m^2/g$.

Example 9

Titania Extrudate Comprising Mesopores and Macropores Prepared Using Cellulose Fibre as the Porogen at Pilot Plant Scale The materials set out in Example 5 were used to prepare a porous, extruded titania-based material comprising mesopores and macropores on a pilot scale. The titanium oxide (BASF P25) and cellulose fibre (Aldrich Cellulose Fibre) were mixed at a mass ratio of titanium oxide to cellulose of 1:0.5.

The mixture was homogenised and formulated with water in a Simpson Muller, and the subsequent paste was extruded using a Bonnet Extruder. The extrudate was dried and calcined as set out in Example 1.

The calcined extrudate of Example 9 was characterised as set out in Comparative Example 1, and the results are shown in Table 1.

The calcined extrudate of Example 9 exhibited a bi-modal pore size distribution with peaks at 30 nm and 125 nm, respectively. The total pore volume was 0.52 ml/g, and the BET surface area was 47 $m^2/g$.

TABLE 1

| Sample | Porogen | Porogen Ratio (g/g) | Pore Volume (ml/g) | Mesopore Distribution (nm) | Macropore Distribution (nm) | Surface Area (m2/g) |
| --- | --- | --- | --- | --- | --- | --- |
| Comparative Example 1 | None | 0 | 0.36 | 28 | — | 51 |
| Example 1 | Cellulose Sigmacell Type 101 | 0.5 | 0.85 | 40 | 825 | 50 |

TABLE 1-continued

| Sample | Porogen | Porogen Ratio (g/g) | Pore Volume (ml/g) | Mesopore Distribution (nm) | Macropore Distribution (nm) | Surface Area (m2/g) |
|---|---|---|---|---|---|---|
| Example 2 | Cellulose Sigmacell Type 101 | 0.4 | 0.67 | 32 | 674 | 51 |
| Example 3 | Cellulose Sigmacell Type 101 | 0.3 | 0.60 | 33 | 675 | 51 |
| Example 4 | Cellulose Sigmacell Type 101 | 0.2 | 0.53 | 33 | 283 | 52 |
| Example 5 | Cellulose Fiber | 0.5 | 0.63 | 30 | 227 | 48 |
| Example 6 | Cellulose Sigmacell Type 20 | 0.5 | 0.64 | 34 | 183 | 48 |
| Example 7 | Cellulose Sigmacell Type 50 | 0.5 | 0.61 | 30 | 139 | 49 |
| Example 8 | Alginic Acid Aldrich | 0.5 | 0.68 | 36 | 504 | 50 |
| Example 9 | Cellulose Fiber (pilot plant scale) | 0.5 | 0.52 | 30 | 125 | 47 |

A comparison of the results for Comparative Example 1 and Examples 1 to 9, as shown in Table 1, clearly shows that the inclusion of a porogen before the extrusion stage, and the subsequent removal thereof, allows the preparation of a porous, extruded titania-based material comprising mesopores and macropores. The resulting materials also have significantly increased total pore volume, but without any effect on BET surface area.

Comparative Example 2

Fischer-Tropsch Catalyst Prepared from a Porous, Extruded Titania-Based Material Comprising Mesopores A Fischer-Tropsch catalyst was prepared by loading the porous, extruded titania-based material comprising mesopores of Comparative Example 1 with a loading of 10% cobalt and 1% manganese; for example, by impregnation with an aqueous solution of cobalt nitrate and manganese acetate using an incipient wetness procedure, followed by drying in air at 60° C. for 5 hours and 120° C. for 5 hours, and calcining at 300° C. for 2 hours with a ramp rate between soaking steps of 2° C./min.

The Fischer-Tropsch catalyst of Comparative Example 2 was characterised as set out in Comparative Example 1, and the material was found to comprise only mesopores, with mean pore diameters of 24 nm.

Example 10

Fischer-Tropsch Catalyst Comprising Mesopores and Macropores

A Fischer-Tropsch catalyst comprising mesopores and macropores was prepared by loading the porous, extruded titania-based material comprising mesopores and macropores of Example 6 with 10% cobalt and 1% manganese, using the method set out in Comparative Example 2.

The Fischer-Tropsch catalyst of Example 10 was characterised as set out in Comparative Example 1, and was found to exhibit a bi-modal pore distribution having peaks at 36 nm and 181 nm, respectively.

Example 11

Comparison of Performance of Fischer-Tropsch Catalysts of Comparative Example 2 and Example 10

The Fischer-Tropsch catalysts of Comparative Example 2 and Example 10 were tested to determine their activity and selectivity in a Fischer-Tropsch process as follows.

The catalysts were each loaded into a fixed bed testing reactor, then reduced in-situ in hydrogen flow at 300° C. for 15 hours. Synthesis gas (a mixture of carbon monoxide and hydrogen) was passed over the catalyst bed using the following conditions:
Temperature: 188° C.
Pressure: 42 barg
Synthesis gas: $H_2/CO$=1.8, with 10% nitrogen
GHSV: 1250 $h^{-1}$ Each catalyst was run for a sufficient period to obtain steady state conditions and the temperature was adjusted to provide a particular level of carbon monoxide conversion (typically between about 60 and 65%). The temperature and pressure were stabilised at 188° C. and 42 barg respectively.

Exit gases were sampled by on-line gas chromatography, and analysed for gaseous products. The degree of carbon monoxide conversion, methane selectivity and selectivity for $C_{5+}$ hydrocarbons were determined for each catalyst. The results are shown in Table 2.

As will be seen from Table 2, the Fischer-Tropsch catalyst of Example 10 comprising mesopores and macropores has improved carbon monoxide conversion and improved selectivity to $C_{5+}$ hydrocarbons compared to the Fischer-Tropsch catalyst of Comparative Example 2 (comprising only mesopores). Additionally, the Fischer-Tropsch catalyst of Example 10 has significantly reduced selectivity to methane compared to the Fischer-Tropsch catalyst of Comparative Example 2, which is particularly advantageous because methane is one of the major components in typical synthesis gas feeds, and the conversion of synthesis gas back to methane is highly undesirable in Fischer-Tropsch processes.

TABLE 2

| Catalyst | Pore size (nm) | | Temp. (° C.) | Pressure (barg) | CO conv. (%) | CH$_4$ select. (%) | C$_{5+}$ select. (%) |
| --- | --- | --- | --- | --- | --- | --- | --- |
| | Mesopores | Macropores | | | | | |
| Mesopore 10% Co—1% Mn/TiO$_2$ Comparative Example 2 | 24 | No | 188 | 42 | 42.3 | 9.7 | 83.3 |
| Meso-macropore 10% Co—1% Mn/TiO$_2$ Example 10 | 36 | 181 | 188 | 42 | 47.4 | 4.8 | 85.8 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A Fischer-Tropsch synthesis catalyst comprising a porous, extruded titania-based material comprising mesopores having a pore diameter of 2 to 50 nm and macropores having a pore diameter of greater than 50 nm, and further comprising at least one metal selected from a group of consisting of cobalt, iron, nickel, ruthenium, and rhodium.

2. A Fischer-Tropsch synthesis catalyst according to claim 1, wherein the at least one metal is present in an amount of from 5 wt % to 30 wt %.

3. A Fischer-Tropsch synthesis catalyst according to claim 1, further comprising one or more promoters.

4. A Fischer-Tropsch synthesis catalyst according to claim 3, wherein the one or more promoters is selected from a group of consisting of rhenium, ruthenium, platinum, palladium, molybdenum, tungsten, boron, zirconium, gallium, thorium, manganese, lanthanum, cerium, and mixtures thereof.

5. A Fischer-Tropsch synthesis catalyst according to claim 1, wherein the at least one metal is cobalt.

6. A Fischer-Tropsch synthesis catalyst according to claim 5, wherein cobalt is present in an amount of from 5 wt % to 30 wt %.

7. A Fischer-Tropsch synthesis catalyst according to claim 5, wherein the mesopores have a pore diameter of 25 to 40 nm and the macropores have a pore diameter in the range of 100 to 850 nm.

8. A Fischer-Tropsch synthesis catalyst according to claim 5, wherein the total pore volume is at least 0.30 ml/g.

9. A Fischer-Tropsch synthesis catalyst according to claim 5, wherein the surface area is at least 30 m$^2$/g.

10. A Fischer-Tropsch synthesis catalyst according to claim 1, wherein the mesopores have a pore diameter of 15 to 45 nm.

11. A Fischer-Tropsch synthesis catalyst according to claim 1, wherein the macropores have a pore diameter in the range of 60 to 1000 nm.

12. A Fischer-Tropsch synthesis catalyst according to claim 1, wherein the mesopores have a pore diameter of 15 to 45 nm and the macropores have a pore diameter in the range of 100 to 850 nm.

13. A Fischer-Tropsch synthesis catalyst according to claim 1, wherein the total pore volume is at least 0.30 ml/g.

14. A Fischer-Tropsch synthesis catalyst according to claim 1, wherein the surface area is at least 30 m$^2$/g.

15. A Fischer-Tropsch synthesis catalyst according to claim 1, wherein the porous, extruded titania-based material is in the form of symmetrical cylinders, dilobes, trilobes, quadralobes or hollow cylinders.

16. A process for the preparation of a Fischer-Tropsch synthesis catalyst according to claim 1, said process comprising:
   a) mixing titanium dioxide and one or more porogens to form a homogeneous mixture;
   b) adding a solution of at least one thermally decomposable cobalt, iron, nickel, ruthenium or rhodium compound to the mixture, and mixing to form a homogeneous paste;
   c) extruding the paste to form an extrudate;
   d) optionally, drying the extrudate;
   e) calcining the extrudate at a temperature sufficient to decompose the one or more porogens and to convert the at least one thermally decomposable cobalt, iron, nickel, ruthenium or rhodium compound to an oxide thereof, or to the metal form, and, where an oxide is formed, optionally
   f) heating the calcined extrudate under reducing conditions to convert the at least one cobalt, iron, nickel, ruthenium or rhodium oxide to the metal form.

17. A process for the preparation of a Fischer-Tropsch synthesis catalyst according to claim 1, said process comprising:

a) impregnating a porous, extruded titania-based material comprising mesopores and macropores with a solution of at least one thermally decomposable cobalt, iron, nickel, ruthenium or rhodium compound;
b) drying and/or calcining the impregnated porous extruded titania-based material at a temperature sufficient to convert the at least one thermally decomposable cobalt, iron, nickel, ruthenium or rhodium compound to an oxide thereof, or to the metal form; and, wherein an oxide is formed, optionally
c) heating the dried and/or calcined porous extruded titania-based material under reducing conditions to convert the at least one cobalt, iron, nickel, ruthenium or rhodium oxide to the metal form.

18. A process for converting a mixture of hydrogen and carbon monoxide gases to hydrocarbons, which process comprises contacting a mixture of hydrogen and carbon monoxide with a Fischer-Tropsch synthesis catalyst according to claim 1.

19. A composition, preferably a fuel composition, comprising hydrocarbons prepared by a process according to claim 18.

20. A process for producing a fuel composition, said process comprising blending hydrocarbons prepared by a process according to claim 18 with one or more fuel components to form the fuel composition.

* * * * *